Aug. 25, 1942.   C. E. LOONEY   2,294,039
VEHICLE SEAT
Filed March 24, 1939
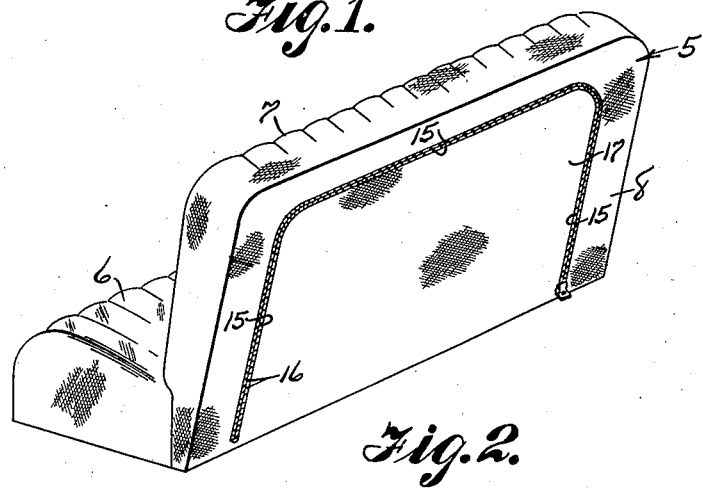
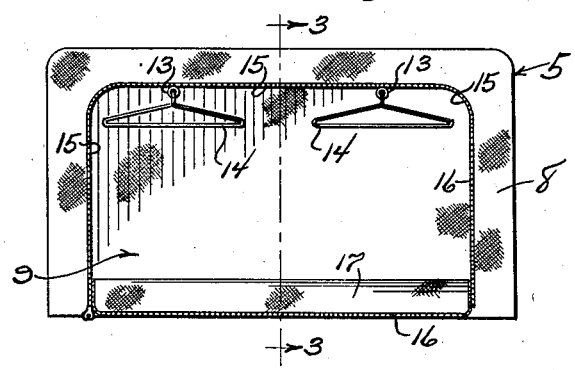
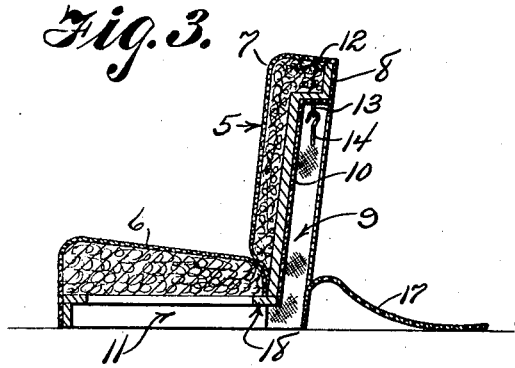
Cansada E. Looney
INVENTOR
BY Victor J. Evans & Co.
ATTORNEYS Patented Aug. 25, 1942

2,294,039

UNITED STATES PATENT OFFICE 2,294,039

VEHICLE SEAT

Cansada E. Looney, Lexington, Ky.

Application March 24, 1939, Serial No. 264,013

2 Claims. (Cl. 155—190)

The present invention relates to vehicle seats and more particularly to automobile seats formed with a storage compartment that is readily accessible for general use.

An important object of the invention resides in the construction of an auto seat whereby there is provided a storage compartment for articles of clothing such as coats, hats or the like.

Another object of the invention resides in modifying the seat cover or upholstery of an auto seat in a manner to form a flap for concealing a compartment formed in the back of the seat, while permitting ready access thereto.

The invention will be fully and comprehensively understood from a consideration of the following detailed description when read in connection with the accompanying drawing which forms a part of the application.

In the drawing:

Figure 1 is a perspective view of an auto seat embodying the features of the present invention.

Figure 2 is a view of the back of the seat illustrated in Figure 1 with the flap removed, for convenience of illustration, and Figure 3 is a vertical sectional view taken substantially on line 3—3 of Figure 2.

Referring to the drawing for a more detailed description thereof, wherein similar reference numerals refer to similar parts throughout the several views, an automobile seat indicated generally by the reference numeral 5 comprises a seat portion 6 and back 7. The seat 5 represents a conventional front seat of a motor vehicle and the seat and back cushion thereof may be formed in any manner well known in the art, with the seat cushion resting upon a supporting frame generally designated by the numeral 18.

The back wall 8 of the seat frame is formed with a cut out portion defining a compartment generally indicated at 9, the interior of the compartment being suitably upholstered as indicated at 10 to present a finished appearance thereto. Beneath the seat cushion 6 and in communication with the compartment 9, there is provided a second compartment 11 which may be conveniently used for storing various small packages receivable therein.

On the ledge 12 formed in the construction of the compartment 9, there is disposed a series of hooks 13 which may be used for accommodating coat hangers or the like 14 on which may be suspended coats or similar garments desired to be stored within the compartment 9.

In practice of the invention, the material forming the seat cover or upholstery is cut at three sides of a rectangular portion, as more clearly shown in Figure 1 of the drawing, and the bottom of said material is left substantially intact. The three cut sides of the flap thus formed and the three cut edges of the seat back 15 are provided with slide or zipper fastener elements 16 so that when closed the flap 17 forms a part and harmonizes with the general upholstery of the seat. The sides of the flap are cut sufficiently long as shown in Figures 1 and 3 of the drawing whereby access to the compartment 11 can be readily obtained.

It is believed that the general utility of the invention is readily apparent from a consideration of the accompanying drawing with the herein described specification. Opening the flap 17 through the slide fastener 16 reveals the compartment 9 which is sufficiently large to permit storage of various articles of clothing such as coats, or the like, which may be suspended on the coat hangers 14 engageable with the hooks 13. Access to the compartment 11 is also obtained by releasing the flap 17 thereby relieving the necessity of removing the seat cushion 6 when desiring to store articles therein. Upon closing the flap through the slide fastener 16 said flap completes the appearance of the seat 5 and harmonizes with the general design of the upholstery covering the back and seat members 6 and 7, respectively.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A vehicle seat comprising, in combination, seat and back cushions, the rear of said back cushion fashioned with a compartment, a second compartment formed beneath said seat cushion and in communication with said first compartment, and a flap cut along three sides of the upholstery covering the rear of said back cushion for concealing said first-named compartment and to permit access to each of said compartments.

2. A vehicle seat comprising, in combination, seat and back cushions, the rear of said back cushion fashioned with a compartment, a second compartment formed beneath said seat cushion and in communication with said first compartment, a flap cut along three sides of the upholstery covering the rear of said back cushion for concealing said first-named compartment and to permit access to each of said compartments, and slidable closure means for said flap.

CANSADA E. LOONEY.